Dec. 12, 1939.   E. SPECKELS   2,183,470
ANIMAL RESTRAINING APPARATUS
Filed June 10, 1938
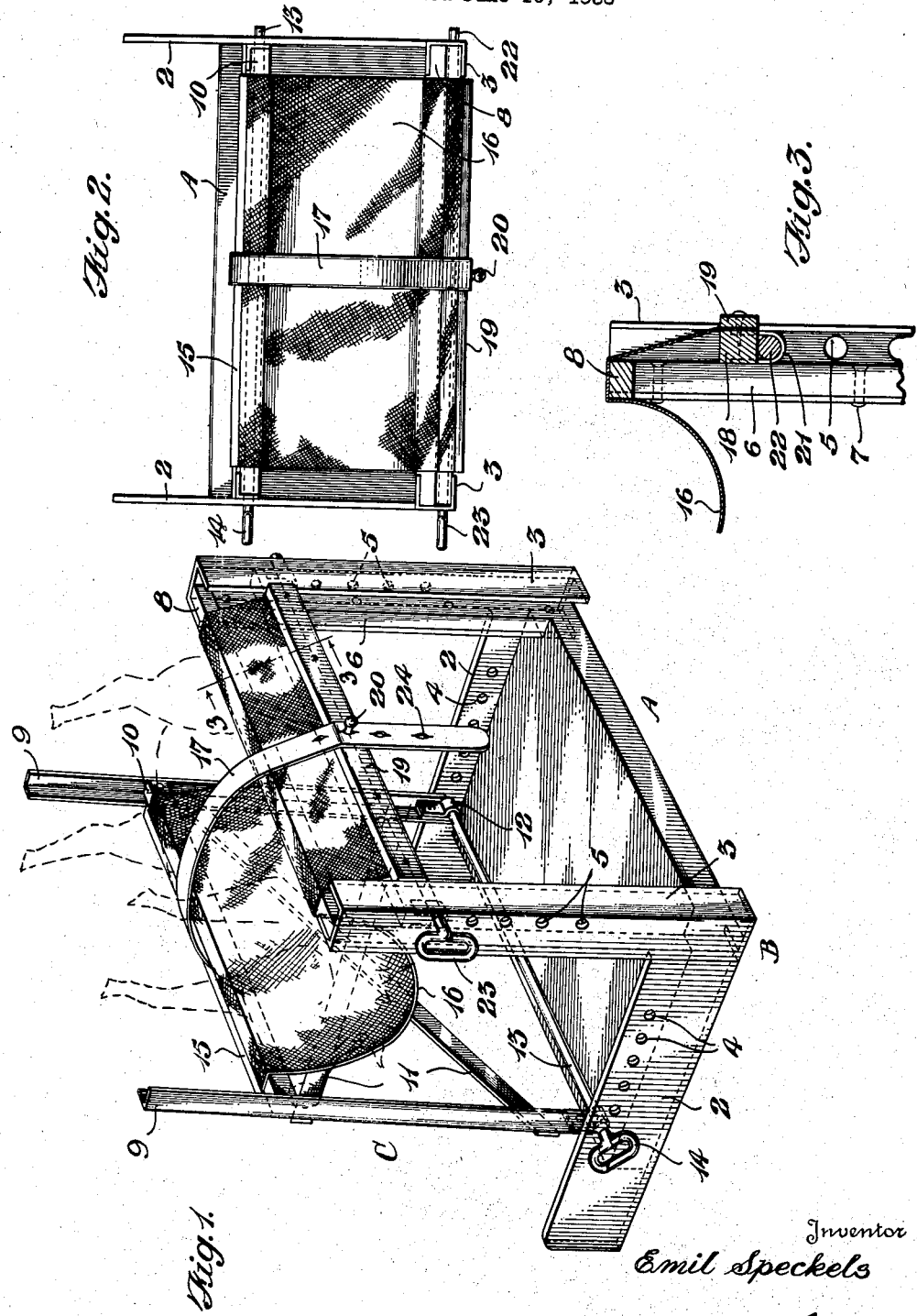

Patented Dec. 12, 1939

2,183,470

UNITED STATES PATENT OFFICE 2,183,470

ANIMAL RESTRAINING APPARATUS

Emil Speckels, Chamberlain, S. Dak.

Application June 10, 1938, Serial No. 213,065

7 Claims. (Cl. 119—103)

This invention relates to an animal restraining apparatus, and pertains more particularly to an apparatus for holding animals during surgical operations, although same is not restricted to such use.

The primary important object of this invention is to provide an apparatus of the above character which may be easily and quickly adjusted for holding animals of various sizes.

Another important object of the invention is to provide an apparatus of the above character in which an animal is securely held in proper operating position.

Another important object of this invention is to provide an apparatus of the above character in which an animal is comfortably held without danger of injury.

Still another important object of this invention is to provide an apparatus of the above character which is of simple construction, and one which may be readily and cheaply manufactured and placed upon the market at a reasonable cost.

The foregoing and other objects and advantages will be readily apparent throughout the course of the following description and drawing, in which:

Figure 1 is a perspective view of the apparatus, with an animal held therein as disclosed in dotted lines, Figure 2 is a top plan view of the apparatus disclosed in Fig. 1, and Figure 3 is a fragmentary sectional view, taken on line 3—3 of Fig. 1, showing a portion of the supporting apron, the securing means for one end thereof, and one of the guides for the latter.

Referring in detail to the drawing, and noting particularly that the apparatus may be constructed of metal, wood or any other suitable material, A designates a substantially rectangular base.

Secured to each of the ends of the base A is an L-shaped or right-angle member B, each of which comprises a horizontal leg portion 2 and a vertical guide standard 3 connected thereto, as by welding, or in any other suitable manner.

The horizontal leg portion 2 of each of the members B is of greater vertical width than the thickness of the base to provide a flange for said base having a horizontal row of spaced openings 4 which aline with the openings in the horizontal leg portion of the opposite L-shaped member.

Each of the guide standards 3 is composed of channel iron, substantially U-shaped in cross-section, the bight portions of the standards being each provided with a vertically extending row of openings 5 alined with the corresponding openings in the opposite standard. For bracing purposes and to prevent spreading movement of the standards away from each other, the latter are connected by an inverted substantially U-shaped frame, the depending legs 6 of which are secured to the standards by bolts 7 or other fasteners, while the bight portion 8 of the frame further provides a support for a purpose to be hereinafter more fully described.

Mounted for adjustable swinging movement toward and away from the standards 3 and bight portion 8 of the bracing frame between the horizontal leg portions 2 of the L-shaped members B, is a second frame C composed of spaced upright angle iron standards 9 secured together by a horizontal bar 10 and cross-bracing 11. The lower end of each of the angle iron standards 9 is provided with a loop member 12 through which and through corresponding openings 4 in leg portions 2, passes a removable bar 13 having one of its ends formed with a handle 14 whereby the same may be readily inserted and withdrawn for making the necessary adjustments.

Securely fastened to the bar 10, by means of a clamping bar 15 is one end of a flexible apron 16 and one end of a flexible holding strap 17.

Slidably mounted for vertical adjustment in and between the guide standards 3 is a bar 18 to which the opposite free end of apron 16, passing over bight portion 8 of the inverted U-shaped frame is fastened by clamping bar 19, which latter carries a headed stud 20 intermediate its ends. For securing the bar 18 in its vertically adjusted positions, same is provided with spaced depending loop members 21 through which and through alined openings 5 in the guides 3, passes a removable bar 22 provided at one of its ends with a handle 23. The free end of the strap 17 is provided with a series of spaced openings 24 for receiving the headed stud 20 in various positions of adjustment depending upon the girth of the animal to be held.

When it is desired to use the apparatus for performing an operation upon an animal, and assuming that bar 22 has been withdrawn from the standards 3, the free end of the apron carried between members 18 and 19 is moved in a downward direction between the standards for a predetermined distance depending upon the size of the animal to be supported, whereupon the bar 22 is replaced to a position for holding the free end of the apron in its adjusted position. The animal is then placed on its back upon the apron and the strap 17 drawn over the under side of the body of the animal This operation causes the upper end of frame C to swing toward the stationary frame defined by the standards 3 and inverted U-shaped frame. When the limit of movement of the frame C toward the stationary frame and against one side of the body of the animal has been reached, the free end of strap 17 is secured by causing the stationary stud 20 to be projected through one of the openings 24 of the strap. It will thus be seen that the animal is not only held in position in the apparatus by the strap 17 passing over its girth but is also held by the upper ends of the frames grippingly engaging the sides and flanks of the animal.

It is to be particularly noted that the hereindescribed apparatus may be quickly adjusted for animals of various sizes by moving the lower end of frame C toward or away from the stationary frame and further by correspondingly adjusting the intermediate portion of the supporting apron 16 to proper position.

From the foregoing it will be apparent that the instant apparatus affords a simple and efficient means for comfortably and securely supporting an animal in proper operating position.

It is to be understood that the form of my invention herewith shown and described, is to be taken as a preferred example of the same, and that various changes in the shape, size, and arrangement of parts may be resorted to, without departing from the spirit of my invention, or the scope of the subjoined claims.

Having thus described my invention, I claim:

1. An apparatus of the character described including a base, a vertically disposed frame rigidly secured to said base, a second frame having its lower end adjustably and pivotally secured to the base, an apron having one of its ends secured to the upper end of the second frame, means adjustably connecting the free end of the apron to the first named frame, and means for drawing the upper end of the second named frame toward the first named frame and for securing the second named frame in said last named position.

2. An apparatus of the character described including a base, a pair of spaced vertical guide members secured to the base, a cross bar connecting the upper ends of the guide members, a support pivotally secured to the base and adjustable toward and away from said guide members, and a flexible supporting member having one of its ends connected to the support, and having its free end disposed over the cross bar and adjustably connected to said guide members.

3. An apparatus of the character described including a base, a pair of spaced vertical guide members secured to the base, a cross bar connecting the upper ends of the guide members, a support pivotally secured to the base and adjustable toward and away from said guide members, a flexible supporting member having one of its ends connected to the support, and having its free end disposed over the cross bar and adjustably connected to said guide members, and means for moving the pivoted support toward the guide members and for holding same in said position.

4. An apparatus of the character described including a base, a pair of spaced vertically disposed guide members, an inverted U-shaped brace for connecting said guide members, a frame having its lower end pivotally connected to the base and horizontally adjustable toward and away from said guide members, a flexible supporting apron having one of its ends secured to the free upper end of the frame, means for adjustably connecting the opposite end of the apron to said guide members, and means for adjustably connecting the upper end of the frame to the guide members.

5. An animal restraining device, including a base, a vertically disposed holding member secured to the base, a second vertically disposed holding member spaced from the first member and pivoted at its lower portion to the base for swinging movements toward and away from the first member, flexible means for receiving the back of an animal disposed in the space between and secured to the members, and combined means connected to one of the members and adjustably secured to the other member for engaging the under side of the body of the animal to hold the latter onto the flexible means and to simultaneously swing the pivoted member toward the first member thereby to engage the sides of the body of the animal and to hold the pivoted member against retrogressive swinging upon securement of said combined means in its adjusted position.

6. An animal restraining device in accordance with claim 5, wherein the flexible means consists of an apron, and wherein means is provided to vertically adjust the flexible means on one side thereof in accordance with the size of the animal.

7. An animal restraining device in accordance with claim 5, wherein the flexible means consists of an apron-like member, and wherein the combined means includes a strap.

EMIL SPECKELS.